(No Model.)

W. H. HAMILTON.
ANIMAL TRAP.

No. 577,745. Patented Feb. 23, 1897.

Witnesses
H. B. Hallock.
S. S. Williamson.

Inventor:
Wallis H. Hamilton
by Geo. H. Holgate
Attorney

UNITED STATES PATENT OFFICE.

WALLIS H. HAMILTON, OF PALMYRA, NEW JERSEY.

ANIMAL-TRAP.

SPECIFICATION forming part of Letters Patent No. 577,745, dated February 23, 1897.

Application filed September 14, 1896. Serial No. 605,726. (No model.)

*To all whom it may concern:*

Be it known that I, WALLIS H. HAMILTON, a citizen of the United States, residing at Palmyra, in the county of Burlington and State of New Jersey, have invented certain new and useful Improvements in Animal-Traps, of which the following is a specification.

This invention relates to a new and useful improvement in animal-traps, and more especially to that class known as "choke-traps" for mice, and has for its object to so construct a device of this description as to deceive a mouse into securing the bait by gnawing away a cord or thread, which will spring the choke, thereby catching the mouse; and a further object of this invention is to greatly simplify and cheapen the construction of a trap of this description and so facilitate the setting thereof as to enable a person with little or no mechanical skill to put it in condition for catching mice, and which will not require that the bait shall be secured upon a trigger.

With these ends in view this invention consists in the details of construction and combination of elements hereinafter set forth, and then specifically designated by the claim.

In order that those skilled in the art to which this invention appertains may understand how to make and use the same, its construction and operation will now be described in detail, referring to the accompanying drawings, forming a part of this specification, in which—

Figure 1:
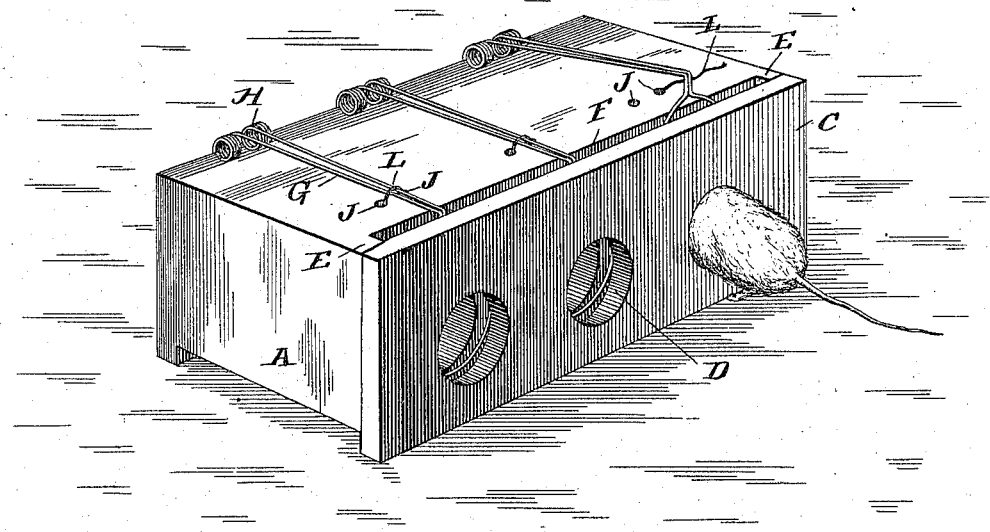
Figure 2:
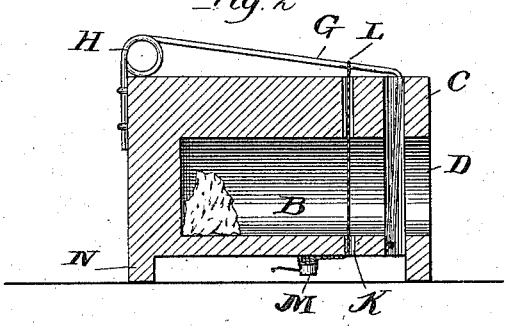

Figure 1 is a perspective of a trap made in accordance with my improvement, illustrating one of the choke-wires sprung and a mouse caught thereby; Fig. 2, a section through one of the compartments of the trap, illustrating the method of holding the choke-wire in set position; and Fig. 3, a detail longitudinal section of a portion of the trap, further showing the manner of setting the choke-wire.

In carrying out my invention I provide a block A, in which is formed a number of compartments B, preferably round in cross-section in order to facilitate their formation, which is brought about by boring, and place over the front of this block a strip C, which has holes D, formed therein, arranged to register with the compartments, and this strip is preferably arranged at a slight distance from the face of the block in which the compartments are formed by being secured to the ledges E, as clearly shown in Fig. 1, thereby forming a space F.

The choke-wires G are secured in any convenient manner to the rear portion of the block and are so bent as to provide the coils H and the loops I, which latter are arranged to surround the openings to the compartments when in their set position and to move across the same when sprung for the purpose of catching the mouse.

Figure 3:
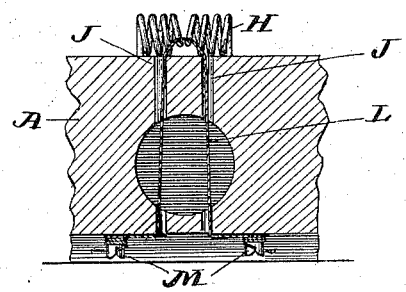

Pairs of holes J are formed through the upper portion of the block so as to pass into each of the compartments, and pairs of holes K are also formed through the lower portion of the block leading from the compartments, and these holes are utilized for the passage of the threads or cords L, each of which serves to secure one of the choke-wires in its set position by being passed downward through the holes J and K, and the ends thereof being attached to the pegs M, as clearly shown in Figs. 2 and 3. These pegs may be made of wood and split, so that after the ends of the thread have been given several turns around the pegs they may be drawn within the slits, thereby firmly securing them in place, so that to set a trap of this construction the bait is first placed within the compartments and the threads arranged as just described, thereby providing two bars for each compartment in front of the bait contained therein, so that the mouse in gaining access to the bait must first gnaw away one of the threads, which will release the choke-wire and permit the loop thereof to move upward, thereby catching the mouse.

One of the peculiarities of a mouse is that it is exceedingly timid in approaching a bait which is clearly exposed, but will without hesitation proceed to gnaw away any obstruction which may be interposed between it and the bait, and I therefore take advantage of this characteristic by protecting the bait from the mouse with the bars of thread, which may be quickly severed and which will deceive the mouse into trying to gain access to said bait.

Another advantage of my improvement is that the loops of the choke-wires are arranged between the strip C and the face of the block, thereby giving said loops a firmer hold upon the neck of the mouse, when cut, than would otherwise be the case, and, further, the location of the thread-bars is such as to bring the neck of the mouse into the best position for catching.

In order that the pegs M may not come in contact with the surface upon which the trap stands, a ledge N is formed upon the block and the strip C extends downward below the surface of said block to a distance equal to the width of said ledge, thereby leaving a space between the bottom of the block and the surface upon which it stands, as clearly shown.

I have shown three compartments and a corresponding number of choke-wires, but it is obvious that these may be increased or decreased in number, and in practice I have found that six compartments is a very desirable number in that it does not increase the cumbersomeness of the trap, yet enables it to catch a greater number of mice at a single setting.

Having thus fully described this invention, what is claimed as new and useful is—

In a device of the character described, the combination of a block having compartments, apertures arranged vertically through the block and intersecting the compartments, securing-pins arranged in the bottom and having split ends, chokers consisting of wires doubled on themselves with a loop formed centrally, the loop portion being bent at approximately right angles to the body of the wires, springs formed by coiling the wires near each end, said coils resting on the top of the block, the ends of said wire extending down the rear edge of the block and secured in place and a string looped over the spring-arm with the ends passing through the apertures of the block and controlling the entrance to the compartments the ends of the string being secured in the split ends of the pegs, substantially as described.

In testimony whereof I have hereunto affixed my signature in the presence of two subscribing witnesses.

WALLIS H. HAMILTON.

Witnesses:
S. S. WILLIAMSON,
MARK BUFORD.